US009749363B2

(12) United States Patent
Balasaygun et al.

(10) Patent No.: US 9,749,363 B2
(45) Date of Patent: Aug. 29, 2017

(54) APPLICATION OF ENTERPRISE POLICIES TO WEB REAL-TIME COMMUNICATIONS (WEBRTC) INTERACTIVE SESSIONS USING AN ENTERPRISE SESSION INITIATION PROTOCOL (SIP) ENGINE, AND RELATED METHODS, SYSTEMS, AND COMPUTER-READABLE MEDIA

(71) Applicant: Avaya Inc., Basking Ridge, NJ (US)

(72) Inventors: Mehmet Balasaygun, Freehold, NJ (US); Joel Ezell, Broomfield, CO (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 129 days.

(21) Appl. No.: 14/255,429

(22) Filed: Apr. 17, 2014

(65) Prior Publication Data
US 2015/0304359 A1    Oct. 22, 2015

(51) Int. Cl.
*H04L 29/06* (2006.01)
(52) U.S. Cl.
CPC ........ *H04L 65/1006* (2013.01); *H04L 65/105* (2013.01); *H04L 65/1069* (2013.01)
(58) Field of Classification Search
CPC . H04L 65/1073; H04L 61/2564; H04L 67/02; H04M 3/523
See application file for complete search history.

(56) References Cited

U.S. PATENT DOCUMENTS 6,714,967 B1    3/2004 Horvitz
7,107,316 B2    9/2006 Brown et al.
(Continued)

FOREIGN PATENT DOCUMENTS

EP    1615386 A1    1/2006
EP    2529316 A2    12/2012
(Continued)

OTHER PUBLICATIONS

Andreasen et al., "Session Description Protocol (SDP): Security Descriptions for Media Streams," Network Working Group, Request for Comments: 4568, Standards Track, The Internet Society, Jul. 2006, 40 pages.
(Continued)

*Primary Examiner* — Nicholas Taylor
*Assistant Examiner* — Sanjoy Roy
(74) *Attorney, Agent, or Firm* — Sheridan Ross P.C.

(57) ABSTRACT

Application of enterprise policies to Web Real-Time Communications (WebRTC) interactive sessions using an enterprise Session Initiation Protocol (SIP) engine, and related methods, systems, and computer-readable media are disclosed. In one embodiment, a method comprises receiving, by session token converter of enterprise device, an incoming WebRTC session description token. The method comprises generating, by session token converter, outgoing SIP request message. The method comprises sending, by session token converter, outgoing SIP request message to enterprise SIP engine and applying, by enterprise SIP engine, enterprise policies based on outgoing SIP request message. The method comprises, responsive to applying enterprise policies, sending incoming SIP request message to enterprise device. The method comprises converting, by session token converter, incoming SIP request message into outgoing WebRTC session description token, and sending outgoing WebRTC session description token to a target device.

20 Claims, 11 Drawing Sheets

(56) References Cited

U.S. PATENT DOCUMENTS

| | | | |
|---|---|---|---|
| 7,145,898 B1 | 12/2006 | Elliott | |
| 7,266,591 B1 | 9/2007 | Johnston | |
| 7,379,993 B2 | 5/2008 | Valdes et al. | |
| 7,636,348 B2 | 12/2009 | Bettis et al. | |
| 7,730,309 B2 | 6/2010 | Zimmermann | |
| 8,015,484 B2 | 9/2011 | Backer | |
| 8,250,635 B2 | 8/2012 | Chari et al. | |
| 8,300,632 B2 | 10/2012 | Davis et al. | |
| 8,467,308 B2 | 6/2013 | Johnston | |
| 8,494,507 B1 | 7/2013 | Tedesco et al. | |
| 8,601,144 B1 | 12/2013 | Ryner | |
| 8,605,711 B1 | 12/2013 | Sinnreich et al. | |
| 8,606,950 B2 | 12/2013 | Glatron et al. | |
| 8,693,392 B2 | 4/2014 | Cooper et al. | |
| 8,695,077 B1* | 4/2014 | Gerhard | H04L 63/0815 |
| | | | 726/8 |
| 8,737,596 B2 | 5/2014 | Kelley et al. | |
| 8,744,147 B2 | 6/2014 | Torti | |
| 8,832,271 B2 | 9/2014 | McCarty | |
| 8,856,236 B2 | 10/2014 | Moore et al. | |
| 8,861,692 B1* | 10/2014 | Phelps | H04M 15/39 |
| | | | 370/401 |
| 8,867,731 B2 | 10/2014 | Lum et al. | |
| 2002/0161685 A1 | 10/2002 | Dwinnell | |
| 2003/0112766 A1 | 6/2003 | Riedel et al. | |
| 2003/0120599 A1 | 6/2003 | Agboatwalla et al. | |
| 2003/0131245 A1 | 7/2003 | Linderman | |
| 2003/0188193 A1 | 10/2003 | Venkataramappa | |
| 2004/0019494 A1 | 1/2004 | Ridgeway et al. | |
| 2004/0081173 A1 | 4/2004 | Feather | |
| 2004/0093515 A1 | 5/2004 | Reeves, Jr. | |
| 2004/0167984 A1 | 8/2004 | Herrmann | |
| 2004/0216173 A1 | 10/2004 | Horoszowski et al. | |
| 2005/0084082 A1 | 4/2005 | Horvitz et al. | |
| 2005/0177380 A1 | 8/2005 | Pritchard et al. | |
| 2006/0104526 A1 | 5/2006 | Gringeler et al. | |
| 2006/0155814 A1 | 7/2006 | Bennett et al. | |
| 2006/0159063 A1 | 7/2006 | Kumar | |
| 2006/0200855 A1 | 9/2006 | Willis | |
| 2006/0230438 A1 | 10/2006 | Shappir et al. | |
| 2007/0083929 A1 | 4/2007 | Sprosts et al. | |
| 2007/0143408 A1 | 6/2007 | Daigle | |
| 2007/0255662 A1 | 11/2007 | Tumminaro | |
| 2007/0283423 A1 | 12/2007 | Bradley et al. | |
| 2008/0046414 A1 | 2/2008 | Haub et al. | |
| 2008/0046457 A1 | 2/2008 | Haub et al. | |
| 2008/0046838 A1 | 2/2008 | Haub et al. | |
| 2008/0127137 A1 | 5/2008 | Becker et al. | |
| 2008/0162642 A1 | 7/2008 | Bachiri et al. | |
| 2008/0192646 A1 | 8/2008 | Song et al. | |
| 2008/0270541 A1 | 10/2008 | Keener et al. | |
| 2009/0070477 A1 | 3/2009 | Baum et al. | |
| 2009/0094684 A1 | 4/2009 | Chinnusamy et al. | |
| 2009/0300060 A1 | 12/2009 | Beringer et al. | |
| 2010/0011282 A1 | 1/2010 | Dollard et al. | |
| 2010/0023519 A1 | 1/2010 | Kailash et al. | |
| 2010/0024019 A1 | 1/2010 | Backlund | |
| 2010/0037324 A1 | 2/2010 | Grant et al. | |
| 2010/0118700 A1 | 5/2010 | Blum et al. | |
| 2010/0246571 A1 | 9/2010 | Geppert et al. | |
| 2011/0102930 A1 | 5/2011 | Johnston et al. | |
| 2011/0206013 A1 | 8/2011 | Aramoto et al. | |
| 2011/0238862 A1 | 9/2011 | Chaturvedi et al. | |
| 2012/0001932 A1 | 1/2012 | Burnett et al. | |
| 2012/0079031 A1 | 3/2012 | Matthews et al. | |
| 2012/0137231 A1 | 5/2012 | Maxfield et al. | |
| 2012/0158862 A1 | 6/2012 | Mosko et al. | |
| 2012/0192086 A1 | 7/2012 | Ghods et al. | |
| 2013/0002799 A1 | 1/2013 | Mock | |
| 2013/0078972 A1 | 3/2013 | Levien et al. | |
| 2013/0091286 A1 | 4/2013 | Spencer | |
| 2013/0138829 A1 | 5/2013 | Bulava | |
| 2013/0321340 A1 | 12/2013 | Seo et al. | |
| 2013/0325934 A1 | 12/2013 | Fausak et al. | |
| 2013/0346329 A1 | 12/2013 | Alib-Bulatao et al. | |
| 2014/0013202 A1 | 1/2014 | Schlumberger | |
| 2014/0043994 A1 | 2/2014 | Bansal et al. | |
| 2014/0095633 A1 | 4/2014 | Yoakum | |
| 2014/0095724 A1 | 4/2014 | Yoakum et al. | |
| 2014/0095731 A1 | 4/2014 | Carey et al. | |
| 2014/0108594 A1 | 4/2014 | Siegel et al. | |
| 2014/0126708 A1 | 5/2014 | Sayko | |
| 2014/0126714 A1 | 5/2014 | Sayko | |
| 2014/0126715 A1* | 5/2014 | Lum | H04M 3/5133 |
| | | | 379/265.09 |
| 2014/0143823 A1 | 5/2014 | Manchester et al. | |
| 2014/0149512 A1 | 5/2014 | Leitch | |
| 2014/0161237 A1 | 6/2014 | Tolksdorf | |
| 2014/0201820 A1 | 7/2014 | Li et al. | |
| 2014/0219167 A1 | 8/2014 | Santhanam et al. | |
| 2014/0222894 A1* | 8/2014 | Gangadharan | H04L 67/02 |
| | | | 709/203 |
| 2014/0222930 A1* | 8/2014 | Gangadharan | H04L 51/04 |
| | | | 709/206 |
| 2014/0223452 A1 | 8/2014 | Santhanam et al. | |
| 2014/0237057 A1 | 8/2014 | Khodorenko | |
| 2014/0241215 A1 | 8/2014 | Massover et al. | |
| 2014/0244235 A1 | 8/2014 | Michaelis | |
| 2014/0245143 A1 | 8/2014 | Saint-Marc | |
| 2014/0258822 A1 | 9/2014 | Li et al. | |
| 2014/0269326 A1 | 9/2014 | Westin et al. | |
| 2014/0270104 A1 | 9/2014 | O'Connor | |
| 2014/0280734 A1 | 9/2014 | Chaturvedi et al. | |
| 2014/0282054 A1 | 9/2014 | Yoakum | |
| 2014/0282135 A1 | 9/2014 | Segre | |
| 2014/0282399 A1 | 9/2014 | Gorelik et al. | |
| 2014/0282765 A1 | 9/2014 | Casey et al. | |
| 2014/0282903 A1 | 9/2014 | Singh et al. | |
| 2014/0324979 A1 | 10/2014 | Gao et al. | |
| 2014/0325078 A1* | 10/2014 | Shan | H04W 36/0066 |
| | | | 709/227 |
| 2014/0344169 A1 | 11/2014 | Phelps et al. | |
| 2014/0348044 A1* | 11/2014 | Narayanan | H04L 65/1016 |
| | | | 370/310 |
| 2014/0365676 A1 | 12/2014 | Yoakum | |
| 2014/0379931 A1 | 12/2014 | Gaviria | |
| 2015/0002614 A1* | 1/2015 | Zino | H04N 7/148 |
| | | | 348/14.08 |
| 2015/0002619 A1 | 1/2015 | Johnston et al. | |
| 2015/0006610 A1 | 1/2015 | Johnston et al. | |
| 2015/0006611 A1 | 1/2015 | Johnston et al. | |
| 2015/0026473 A1 | 1/2015 | Johnston et al. | |
| 2015/0036690 A1 | 2/2015 | Pastro | |
| 2015/0039687 A1 | 2/2015 | Waxman et al. | |
| 2015/0039760 A1 | 2/2015 | Yoakum | |
| 2015/0052067 A1 | 2/2015 | Thiyagarajan et al. | |
| 2015/0180825 A1* | 6/2015 | Ren | H04L 61/2564 |
| | | | 709/228 |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Baugher et al., "The Secure Real-time Transport Protocol (SRTP)," Network Working Group, Request for Comments: 3711, Standards Track, The Internet Society, Mar. 2004, 51 pages.

Johnston, Alan et al., "Taking on WebRTC in an Enterprise," IEEE Communications Magazine, Apr. 2013, pp. 48-54, vol. 51, Issue 4.

(56) References Cited

OTHER PUBLICATIONS

Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Search Report for British patent application GB1317121.0 mailed Mar. 14, 2014, 3 pages.
Search Report for British patent application GB1317122.8 mailed Mar. 11, 2014, 3 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusetts, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, mailed Sep. 12, 2014, 15 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.

Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.
Final Office Action and Examiner Initiated Interview Summary for U.S. Appl. No. 14/050,891, mailed Jun. 29, 2015, 11 pages.
Final Office Action for U.S. Appl. No. 13/955,023, mailed Jul. 20, 2015, 17 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Extended European Search Report for European Patent Application 15161452.6, mailed Jun. 23, 2015, 5 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/931,968, mailed Dec. 8, 2014, 6 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.
Non-Final Office Action for U.S. Appl. No. 13/955,023, mailed Feb. 2, 2015, 12 pages.
Author Unknown, "WebRTC," WebRTC.org, Date Accessed: Jan. 26, 2016, 4 pages, http://webrtc.org/.
Notice of Allowance for U.S. Appl. No. 13/863,662, mailed Feb. 1, 2016, 17 pages.

(56) References Cited

OTHER PUBLICATIONS

Advisory Action and Examiner-Initiated Interview Summary for U.S. Appl. No. 14/068,839, mailed Feb. 12, 2016, 4 pages.
Final Office Action for U.S. Appl. No. 14/141,798, mailed Dec. 24, 2015, 10 pages.
Non-Final Office Action for U.S. Appl. No. 14/174,371, mailed Feb. 18, 2016, 18 pages.
Non-Final Office Action for U.S. Appl. No. 13/931,970, mailed Feb. 23, 2016, 11 pages.
Non-Final Office Action for U.S. Appl. No. 13/955,711, mailed Nov. 9, 2015, 10 pages.
Notice of Allowance for U.S. Appl. No. 14/050,891, mailed Nov. 10, 2015, 10 pages.
Non-Final Office Action for U.S. Appl. No. 13/955,023, mailed Dec. 9, 2015, 13 pages.
Non-Final Office Action for U.S. Appl. No. 14/037,440, mailed Oct. 22, 2015, 15 pages.
Advisory Action for U.S. Appl. No. 13/931,967, mailed Nov. 3, 2015, 3 pages.
Advisory Action for U.S. Appl. No. 13/931,970, mailed Nov. 5, 2015, 3 pages.
Non-Final Office Action for U.S. Appl. No. 14/068,943, mailed Dec. 2, 2015, 16 pages.
Search Report for British Patent Application No. GB1423089.0, mailed Jul. 6, 2015, 4 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Examination Report for British Patent Application GB1411584.4, mailed Aug. 21, 2015, 1 page.
Examination Report for British Patent Application GB1411580.2, mailed Aug. 21, 2015, 1 pages.
Notification of Reasons for Refusal for Japanese Patent Application 2013-201221, mailed Aug. 25, 2015, 8 pages.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Non-Final Office Action for U.S. Appl. No. 13/863,662, mailed Sep. 25, 2015, 23 pages.
Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Advisory Action and Examiner-Initiated Interview Summary for U.S. Appl. No. 14/050,891, mailed Sep. 29, 2015, 4 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Final Office Action for U.S. Appl. No. 13/931,970, mailed Aug. 27, 2015, 10 pages.

\* cited by examiner

US 9,749,363 B2

APPLICATION OF ENTERPRISE POLICIES TO WEB REAL-TIME COMMUNICATIONS (WEBRTC) INTERACTIVE SESSIONS USING AN ENTERPRISE SESSION INITIATION PROTOCOL (SIP) ENGINE, AND RELATED METHODS, SYSTEMS, AND COMPUTER-READABLE MEDIA

RELATED APPLICATIONS

This application is related to U.S. patent application Ser. No. 13/863,662 filed on Apr. 16, 2013, entitled "Distributed Applications of Enterprise Policies to Web Real-Time Communications (WebRTC) Interactive Sessions, and Related Methods, Systems, and Computer-Readable Media," which is hereby incorporated herein by reference in its entirety.

BACKGROUND

Field of the Disclosure

The technology of the disclosure relates generally to Web Real-Time Communications (WebRTC) interactive sessions.

Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett (2012 Digital Codex LLC), which is incorporated herein by reference in its entirety.

WebRTC provides built-in capabilities for establishing real-time video, audio, and/or data streams in both point-to-point interactive sessions, as well as multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www/ietf.org.

To establish a WebRTC interactive session (e.g., a real-time video, audio, and/or data exchange), two web clients may retrieve WebRTC-enabled web applications, such as HTML5/JavaScript web applications, from a web application server. Through the web applications, the two web clients then engage in a media negotiation to communicate and reach an agreement on parameters that define characteristics of the WebRTC interactive session. This media negotiation may take the form of a WebRTC "offer/answer" exchange. A WebRTC "offer/answer" exchange typically occurs via a secure network connection such as a Hypertext Transfer Protocol Secure (HTTPS) connection or a Secure WebSockets connection. In an offer/answer exchange, a first web client on a sender device sends an "offer" to a second web client on a recipient device. The offer includes a WebRTC session description object (also referred to as "token") that specifies media types and capabilities that the first web client supports and prefers for use in the WebRTC interactive session. The second web client then responds with a WebRTC session description object "answer" that indicates which of the offered media types and capabilities are supported and acceptable by the second web client for the WebRTC interactive session. Once the WebRTC offer/answer exchange is concluded, the web clients may then establish a direct "peer connection" with one another, and may begin an exchange of media or data packets transporting real-time communications. The peer connection between the web clients typically employs the Secure Real-time Transport Protocol (SRTP) to transport real-time media flows, and may utilize various other protocols for real-time data interchange.

The specific nature of a WebRTC offer/answer exchange may pose a challenge for enterprise networks that wish to apply enterprise-specific policies and/or media features to real-time communications sessions across enterprise network boundaries. For example, an enterprise network may require that enterprise policies, such as WebRTC session restriction policies, be applied, and/or may require that WebRTC sessions be recorded. While many current enterprise networks have an existing engine in place to support other communications protocols (e.g., the Session Initiation Protocol (SIP)), they may require implementation of a separate, parallel engine to support application of enterprise policies to WebRTC interactive sessions. However, implementation of such a parallel engine specifically for WebRTC interactive sessions may prove technically and/or financially burdensome.

SUMMARY OF THE DETAILED DESCRIPTION

Embodiments disclosed in the detailed description include application of enterprise policies to Web Real-Time Communications (WebRTC) interactive sessions using an enterprise Session Initiation Protocol (SIP) engine, and related methods, systems, and computer-readable media. In this regard, in one embodiment, a method for applying enterprise policies to WebRTC interactive sessions using an enterprise SIP engine is disclosed. The method comprises receiving, by a session token converter of an enterprise device within an enterprise network, an incoming WebRTC session description token. The method further comprises generating, by the session token converter, an outgoing SIP request message. The outgoing SIP request message comprises the incoming WebRTC session description token; a return destination of the enterprise device; and an indicator that the outgoing SIP request message originated from an enterprise user. The method further comprises sending, by the session token converter, the outgoing SIP request message to an enterprise SIP engine and applying, by the enterprise SIP engine, one or more enterprise policies based on the outgoing SIP request message. The method further comprises, responsive to applying the one or more enterprise policies, sending an incoming SIP request message to the enterprise device. The method further comprises converting, by the session token converter, the incoming SIP request message into an outgoing WebRTC session description token, and sending the outgoing WebRTC session description token to a target device. In this manner, the session token converter of the enterprise device allows an enterprise network to leverage an existing SIP engine to apply enterprise-specific policies and features to a WebRTC interactive session, without the need for a separate WebRTC engine.

In another embodiment, a system for applying enterprise policies to WebRTC interactive sessions using an enterprise SIP engine is provided. The system comprises at least one communications interface and an enterprise device within an enterprise network associated with the at least one communications interface and comprising a session token converter. The session token converter is configured to receive an incoming WebRTC session description token. The session token converter is further configured to generate an outgoing SIP request message. The outgoing SIP request message comprises the incoming WebRTC session description token; a return destination of the enterprise device; and an indicator that the outgoing SIP request message originated from an enterprise user. The session token converter is further configured to send the outgoing SIP request message to an enterprise SIP engine. The enterprise SIP engine is configured to apply one or more enterprise policies based on the outgoing SIP request message. The enterprise SIP engine is further configured to, responsive to applying the one or more enterprise policies, send an incoming SIP request message to the enterprise device. The session token converter of the enterprise device is further configured to convert the incoming SIP request message into an outgoing WebRTC session description token and send the outgoing WebRTC session description token to a target device.

In another embodiment, a non-transitory computer-readable medium is provided. The non-transitory computer-readable medium has stored thereon computer-executable instructions to cause a processor to implement a method comprising receiving, by a session token converter of an enterprise device within an enterprise network, an incoming WebRTC session description token. The method implemented by the computer-executable instructions further comprises generating, by the session token converter, an outgoing SIP request message. The outgoing SIP request message comprises the incoming WebRTC session description token; a return destination of the enterprise device; and an indicator that the outgoing SIP request message originated from an enterprise user. The method implemented by the computer-executable instructions further comprises sending, by the session token converter, the outgoing SIP request message to an enterprise SIP engine. The method implemented by the computer-executable instructions further comprises applying, by the enterprise SIP engine, one or more enterprise policies based on the outgoing SIP request message. The method implemented by the computer-executable instructions further comprises, responsive to applying the one or more enterprise policies, sending an incoming SIP request message to the enterprise device. The method implemented by the computer-executable instructions further comprises converting, by the session token converter, the incoming SIP request message into an outgoing WebRTC session description token, and sending the outgoing WebRTC session description token to a target device.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
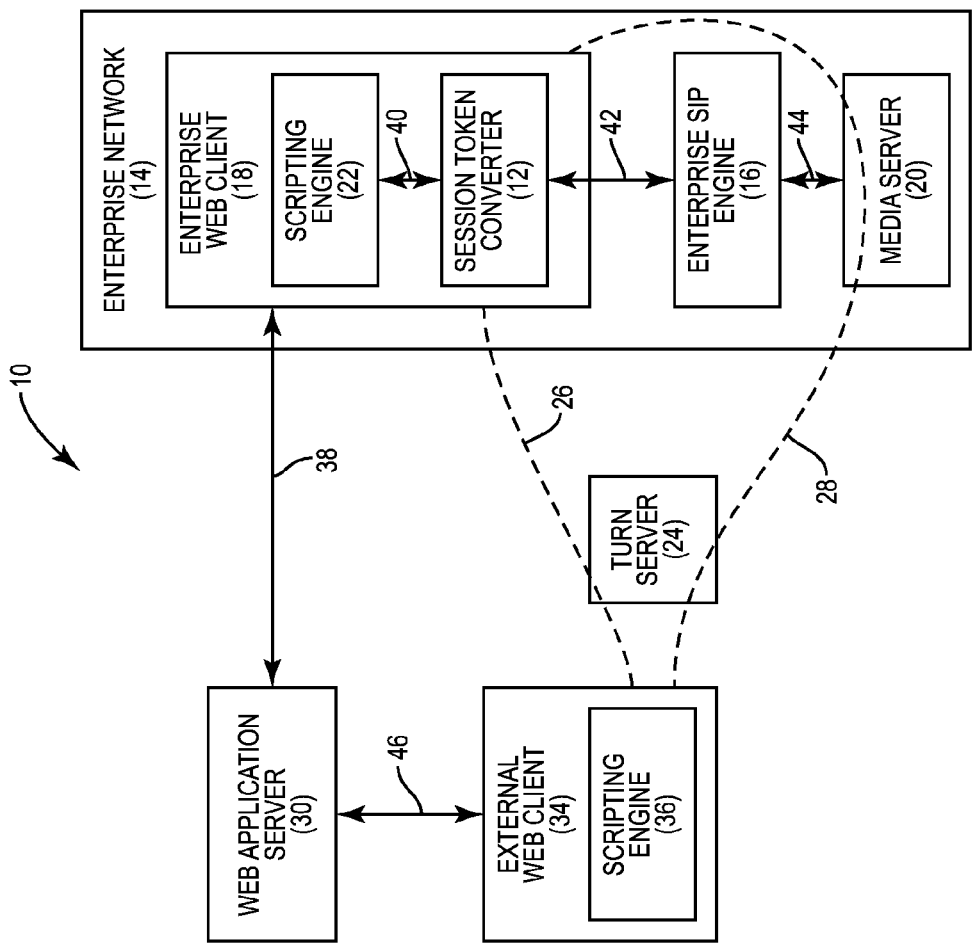
FIG. 1 is a diagram showing an exemplary high-level topology of a Web Real-Time Communications (WebRTC) interactive session between an enterprise web client including a session token converter and an external web client.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include application of enterprise policies to Web Real-Time Communications (WebRTC) interactive sessions using an enterprise Session Initiation Protocol (SIP) engine, and related methods, systems, and computer-readable media. In this regard, in one embodiment, a method for applying enterprise policies to WebRTC interactive sessions using an enterprise SIP engine is disclosed. The method comprises receiving, by a session token converter of an enterprise device within an enterprise network, an incoming WebRTC session description token. The method further comprises generating, by the session token converter, an outgoing SIP request message. The outgoing SIP request message comprises the incoming WebRTC session description token; a return destination of the enterprise device; and an indicator that the outgoing SIP request message originated from an enterprise user. The method further comprises sending, by the session token converter, the outgoing SIP request message to an enterprise SIP engine and applying, by the enterprise SIP engine, one or more enterprise policies based on the outgoing SIP request message. The method further comprises, responsive to applying the one or more enterprise policies, sending an incoming SIP request message to the enterprise device. The method further comprises converting, by the session token converter, the incoming SIP request message into an outgoing WebRTC session description token, and sending the outgoing WebRTC session description token to a target device. In this manner, the session token converter of the enterprise device allows an enterprise network to leverage an existing SIP engine to apply enterprise-specific policies and features to a WebRTC interactive session, without the need for a separate WebRTC engine.

In this regard, FIG. 1 illustrates one embodiment of an exemplary interactive system 10 applying enterprise policies to WebRTC interactive sessions as disclosed herein. More specifically, the system 10 includes a session token converter 12 that provides a mechanism by which enterprise policies may be applied to WebRTC interactive sessions within an enterprise network 14 that includes an existing enterprise SIP engine 16. As used herein, an "enterprise" refers to any organization for the purpose of a business venture or other organized activity, private or public. Further, as used herein, an "enterprise SIP engine" refers to one or more elements within an enterprise network configured to apply enterprise policies to SIP interactive sessions.

With continuing reference to FIG. 1, the system 10 includes the enterprise network 14 that provides networked computing and communications resources to users within an enterprise. The enterprise network 14 includes an enterprise web client 18, the enterprise SIP engine 16, and a media server 20. For purposes of clarity, the system 10 includes only one enterprise web client 18. However, other embodiments may include multiple enterprise web clients 18. The enterprise web client 18 includes a scripting engine 22 and the session token converter 12. The scripting engine 22 enables client-side applications written in a scripting language, such as JavaScript, for example, to be executed within the enterprise web client 18. Further, the enterprise SIP engine 16 applies enterprise policies to an interactive session, while the media server 20 enables media features to be used in conjunction with an interactive session, such as recording audio and/or video within the interactive session, as a non-limiting example. As a non-limiting example, the enterprise SIP engine 16 may be an enterprise SIP communications system. In this regard, the enterprise policies applied by the enterprise SIP engine 16, such as call origination policies, may be implemented using one or more application servers. Additionally, in this embodiment, the media server 20 is an optional component in that it is only employed during setup of an interactive session when the enterprise policies require a particular feature, such as for example, call recording.

Additionally, in some embodiments, the media server 20 may be employed for manipulating and distributing media among WebRTC clients in a multi-party WebRTC session, or among WebRTC clients and non-WebRTC clients in a multi-party communications session. As a non-limiting example, if four (4) WebRTC clients take part in the same multi-party WebRTC session, each WebRTC client may connect to the media server 20, and the media server 20 may function to connect each WebRTC client to the remaining parties in the WebRTC session. The system 10 also includes a Traversal Using Relays around Network Address Translation (NAT) (TURN) server 24 to support communication paths 26 and 28. While FIG. 1 includes the TURN server 24, some embodiments may include additional and/or alternative devices to support the communication paths 26 and 28. Additionally, the system 10 includes a web application server 30 that supports WebRTC applications and interactive sessions. Finally, the system 10 includes an external web client 34 and a corresponding scripting engine 36 that enables scripting-language-based applications to be executed within the external web client 34.

With continuing reference to FIG. 1, in one embodiment of the system 10, the enterprise web client 18 is communicatively coupled to the web application server 30, as indicated by bidirectional arrow 38. In this regard, the enterprise web client 18 initiates a WebRTC interactive session with the external web client 34 by navigating to and downloading a web page related to a particular WebRTC application by way of the web application server 30. Once the web page is downloaded, the scripting engine 22 within the enterprise web client 18 generates a WebRTC offer (not shown) to be sent to the external web client 34 by way of the web application server 30. However, because the enterprise network 14 lacks an enterprise WebRTC engine, the enterprise network 14 is unable to apply enterprise policies directly to the WebRTC offer. In order to apply such enterprise policies to the WebRTC offer prior to being sent to the web application server 30, the session token converter 12 within the enterprise web client 18 intercepts the WebRTC offer. Such an interception is possible because the scripting engine 22 is communicatively coupled to the session token converter 12, as indicated by bidirectional arrow 40. As described in more detail below in embodiments provided herein, the session token converter 12 converts the intercepted WebRTC offer into a SIP request message (not shown), and directs the SIP request message to the enterprise SIP engine 16. By converting the WebRTC offer into the SIP request message, the session token converter 12 enables the existing enterprise SIP engine 16 to apply the enterprise policies to a WebRTC interactive session without requiring an enterprise WebRTC engine.

With continuing reference to FIG. 1, the enterprise SIP engine 16 applies the enterprise policies based on the SIP request message received from the session token converter 12. As a non-limiting example, such policies may include origination and/or termination polices, and may be applied by invoking particular applications or application sequences within the enterprise SIP engine 16. Additionally, in response to applying the enterprise policies, the enterprise SIP engine 16 may send a SIP error code to the session token converter 12. Such a communication is possible because the enterprise SIP engine 16 and the session token converter 12 are communicatively coupled, as indicated by bidirectional arrow 42. The SIP error code may indicate a rejection of the interactive session sought by the SIP request message. Upon receiving such a rejection, the session token converter 12 may end the attempted WebRTC interactive session.

However, if application of the enterprise policies to the SIP request message does not result in a SIP error code, the enterprise SIP engine 16 may continue to process the SIP request message. As described in more detail below, the enterprise SIP engine 16 and the media server 20 are communicatively coupled, as indicated by bidirectional arrow 44. In this regard, if the requested interactive session involves the use of particular media features, the enterprise SIP engine 16 may send information from the SIP request message to the media server 20. The media server 20 allocates resources for the media features for the interactive session, and sends information, such as port and address details, back to the enterprise SIP engine 16. Finally, the enterprise SIP engine 16 sends the SIP request message, with enterprise policies included, to the session token converter 12.

With continuing reference to FIG. 1, the session token converter 12 converts the SIP request message received from the enterprise SIP engine 16 into a WebRTC offer that includes the policies applied by the enterprise SIP engine 16. The session token converter 12 sends the WebRTC offer to the scripting engine 22, and the enterprise web client 18 sends the WebRTC offer to the web application server 30. The web application server 30 is communicatively coupled to the external web client 34, as indicated by bidirectional arrow 46. In this regard, the web application server 30 provides the WebRTC offer to the external web client 34. In this embodiment, the external web client 34 processes the WebRTC offer using the scripting engine 36, and provides a WebRTC answer (not shown) to the web application server 30, thereby accepting the WebRTC offer for an interactive connection with the enterprise web client 18. As described in more detail below, the enterprise web client 18 and the enterprise SIP engine 16 may process the WebRTC answer and establish the WebRTC interactive session. If the WebRTC interactive session does not include media features, the communication path 26 may be established directly between the enterprise web client 18 and the external web client 34. However, if the WebRTC interactive session includes media features provided by the media server 20, the communication path 28 may be established in conjunction with the WebRTC interactive session. Therefore, the system 10 illustrates that the session token converter 12 allows the enterprise network 14, which lacks an enterprise WebRTC engine, to apply enterprise-specific policies to a WebRTC interactive session using the existing enterprise SIP engine 16. While this embodiment provides a high-level description of the system 10 employing the session token converter 12, other systems may include additional elements to establish and support a WebRTC interactive session.

Figure 2:
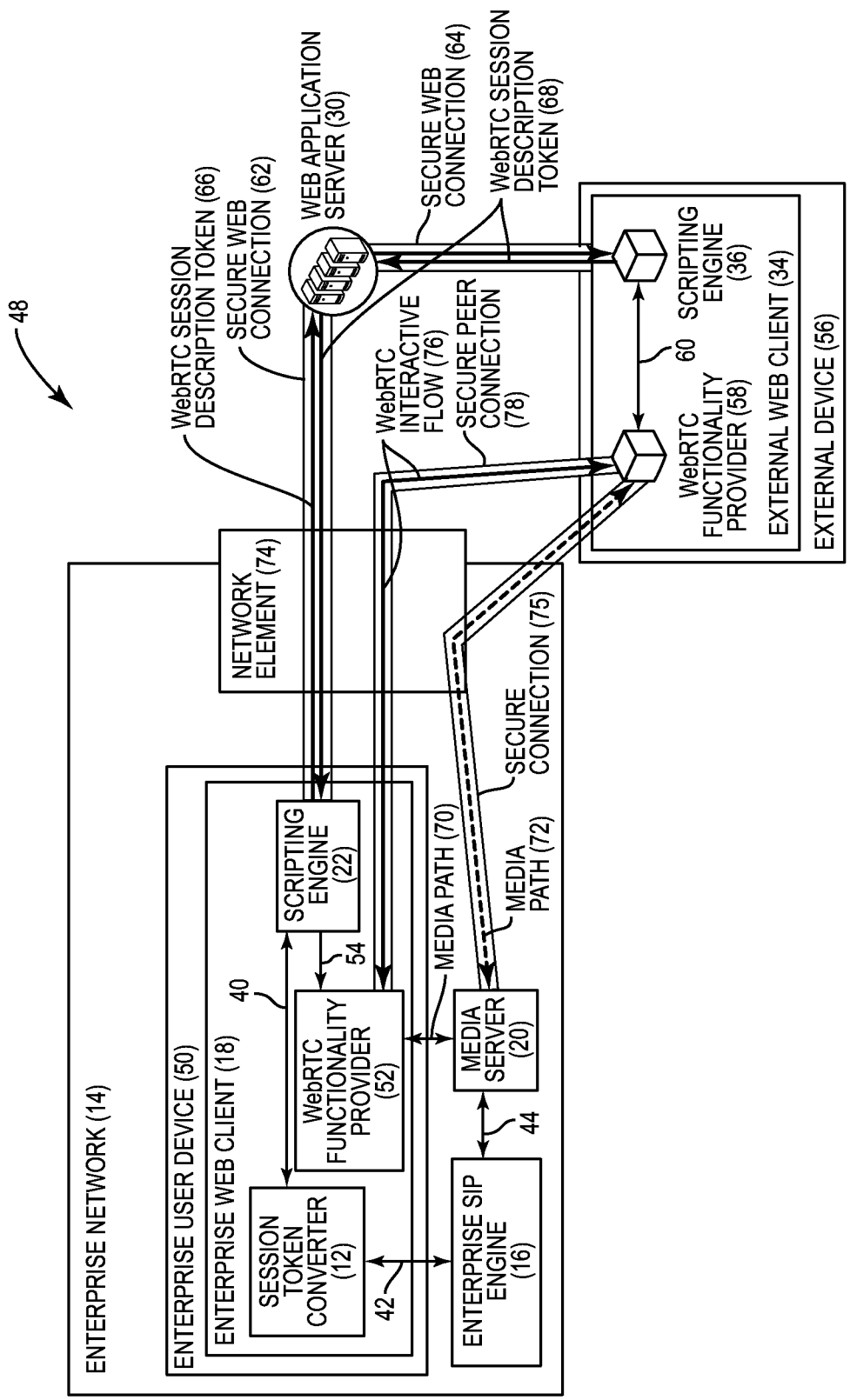
FIG. 2 is a conceptual diagram showing an exemplary "triangle" topology of a WebRTC interactive session between an enterprise web client on an enterprise device including a session token converter and an external web client on an external device.

In this regard, FIG. 2 illustrates another embodiment of an exemplary interactive system 48 using an enterprise SIP engine 16 to apply enterprise policies to WebRTC interactive sessions as disclosed herein. The system 48 includes certain common elements with the system 10 in FIG. 1. Such common elements are denoted by the same number in FIG. 2 as in FIG. 1. In particular, the system 48 includes the session token converter 12 that provides a mechanism by which enterprise policies may be applied to WebRTC interactive sessions within the enterprise network 14 using the existing enterprise SIP engine 16.

Before discussing the details of the session token converter 12, the establishment of a WebRTC interactive session in the system 48 in FIG. 2 is first described. As used herein, a WebRTC interactive session refers to operations for carrying out a WebRTC offer/answer exchange, establishing a peer connection, and commencing a WebRTC interactive flow between two or more endpoints. Within the enterprise network 14 in FIG. 2 is an enterprise device 50 executing the enterprise web client 18. In some embodiments, the enterprise device 50 may be any computing or communications device having network communications capabilities, such as a smartphone, a tablet computer, a dedicated web appliance, or a desktop computer, as non-limiting examples. The enterprise web client 18 in this example may be a web browser application, a dedicated communication application, or an interface-less application such as a daemon or server application, as non-limiting examples.

In this embodiment, the enterprise web client 18 comprises the scripting engine 22 and a WebRTC functionality provider 52. As previously described, the scripting engine 22 enables client-side applications written in a scripting language, such as JavaScript, to be executed within the enterprise web client 18. The scripting engine 22 also provides an application programming interface (API) to facilitate communications with other functionality providers within the enterprise web client 18 and/or the enterprise device 50, and/or with other web clients, devices, or web servers. The WebRTC functionality provider 52 implements the protocols, codecs, and APIs necessary to enable real-time interactive sessions via WebRTC. The scripting engine 22 and the WebRTC functionality provider 52 are communicatively coupled via a set of defined APIs, as indicated by bidirectional arrow 54.

External to the enterprise network 14 is the web application server 30, which serves a WebRTC-enabled web application (not shown) to requesting web clients. In some embodiments, the web application server 30 may be a single server, while in some applications the web application server 30 may comprise multiple servers that are communicatively coupled to each other. It is to be understood that the web application server 30 may reside in the enterprise network 14, or may reside within an enterprise network external to the enterprise network 14.

Also external to the enterprise network 14 is an external device 56 executing the external web client 34. The external device 56 may be any computing or communications device having network communications capabilities, such as a smartphone, a tablet computer, a dedicated web appliance, or a desktop computer, as non-limiting examples. The external web client 34 may be a web browser application, a dedicated communications application, or an interface-less application such as a daemon or service application, as non-limiting examples. In this embodiment, the external web client 34 comprises the scripting engine 36 and a WebRTC functionality provider 58, the functionality of which corresponds to the functionality of the scripting engine 22 and the WebRTC functionality provider 52 of the enterprise web client 18, respectively. The scripting engine 36 and the WebRTC functionality provider 58 are communicatively coupled via a set of defined APIs, as indicated by bidirectional arrow 60. It is to be understood that the external web client 34 may reside within an enterprise network external to the enterprise network 14. It is to be further understood that in some embodiments the enterprise device 50 and the external device 56 may both be located within a same public or private network, or may be located within separate, communicatively coupled public or private networks.

FIG. 2 further illustrates the characteristic WebRTC "triangle" topology that results from establishing a WebRTC interactive session between the enterprise web client 18 and the external web client 34. To establish a WebRTC interactive session, the enterprise web client 18 and the external web client 34 both download WebRTC web applications (not shown) from the web application server 30. In some embodiments, each of the WebRTC web applications comprises an HTML5/JavaScript web application that provides a rich user interface using HTML5, and uses JavaScript to handle user input and to communicate with the web application server 30.

The enterprise web client 18 and the external web client 34 then establish secure web connections 62 and 64, respectively, with the web application server 30, and engage in a WebRTC offer/answer exchange. This is accomplished through an exchange of WebRTC session description tokens as indicated by arrows 66 and 68. In some embodiments, the WebRTC session description tokens may comprise Session Description Protocol (SDP) objects exchanged by the enterprise web client 18 and the external web client 34. The exchanged WebRTC session description tokens 66 and 68 are used to determine the media types and capabilities for the desired WebRTC interactive session.

As previously described, the enterprise network 14 in FIG. 2 includes the enterprise SIP engine 16 and the media server 20. The enterprise SIP engine 16 applies enterprise policies to the WebRTC interactive session during the WebRTC offer/answer exchange, while the media server 20 allows certain media features to be used in conjunction with the WebRTC interactive session. Further, if the media server 20 is employed during the WebRTC offer/answer exchange to apply particular media features to the WebRTC interactive session in this embodiment, the WebRTC functionality provider 52 and the WebRTC functionality provider 58 may establish media paths 70 and 72, respectively, with the media server 20, wherein the media path 72 traverses through a network element 74 over a secure connection 75. Alternatively, in other embodiments, the media path 72 may traverse through the network element 74 and connect directly to the WebRTC functionality provider 52, rather than connecting through the media server 20.

Once the WebRTC offer/answer exchange is concluded, a WebRTC interactive flow 76 may be established via a secure peer connection 78 between the enterprise web client 18 and the external web client 34. Accordingly, in FIG. 2 the vertices of the WebRTC "triangle" are the web application server 30, the network element 74 (which serves as the outer edge of the enterprise network 14 through which the enterprise web client 18 communicates), and the external web client 34. As non-limiting examples, the network element 74 may be a device such as a router, a firewall, a TURN server, or a combination thereof. The edges of the "triangle" are represented by the secure web connections 62 and 64 and the secure peer connection 78.

It is to be understood that some embodiments may utilize topographies other than the WebRTC "triangle" topography illustrated in FIG. 2. For example, some embodiments may employ a "trapezoid" topography in which two web servers communicate directly with each other via protocols such as Session Initiation Protocol (SIP) or Jingle, as non-limiting examples. It is to be further understood that, instead of the enterprise web client 18 and/or the external web client 34, the enterprise device 50 and/or the external device 56 respectively may comprise a SIP client device, a Jingle client device, or a Public Switched Telephone Network (PSTN) gateway device that is communicatively coupled to a telephone.

With continuing reference to FIG. 2, the session token converter 12 is communicatively coupled to the scripting engine 22, as indicated by bidirectional arrow 40. In some embodiments, the session token converter 12 may be implemented as an extension or plug-in for the enterprise web client 18, may be integrated into the WebRTC functionality provider 52 and/or into the browser through the scripting engine 22 and/or another element of the enterprise device, and/or may be part of the WebRTC application (not shown) downloaded from the web application server 30. As discussed in further detail below, this coupling allows the session token converter 12 to receive elements such as WebRTC session description tokens (not shown) from the scripting engine 22. This coupling also allows the session token converter 12 to send elements and messages to the scripting engine 22. Further, the session token converter 12 is communicatively coupled to the enterprise SIP engine 16, as indicated by bidirectional arrow 42. As discussed in further detail below, this coupling allows the session token converter 12 and the enterprise SIP engine 16 to exchange SIP-based messages. Finally, the enterprise SIP engine 16 and the media server 20 are also communicatively coupled, as indicated by bidirectional arrow 44, so that messages between these two elements may be exchanged during initiation of an interactive session. In this manner, the session token converter 12 provides a mechanism by which enterprise features and policies may be applied to WebRTC interactive sessions within the enterprise network 14 using the existing enterprise SIP engine 16.

Figure 3:
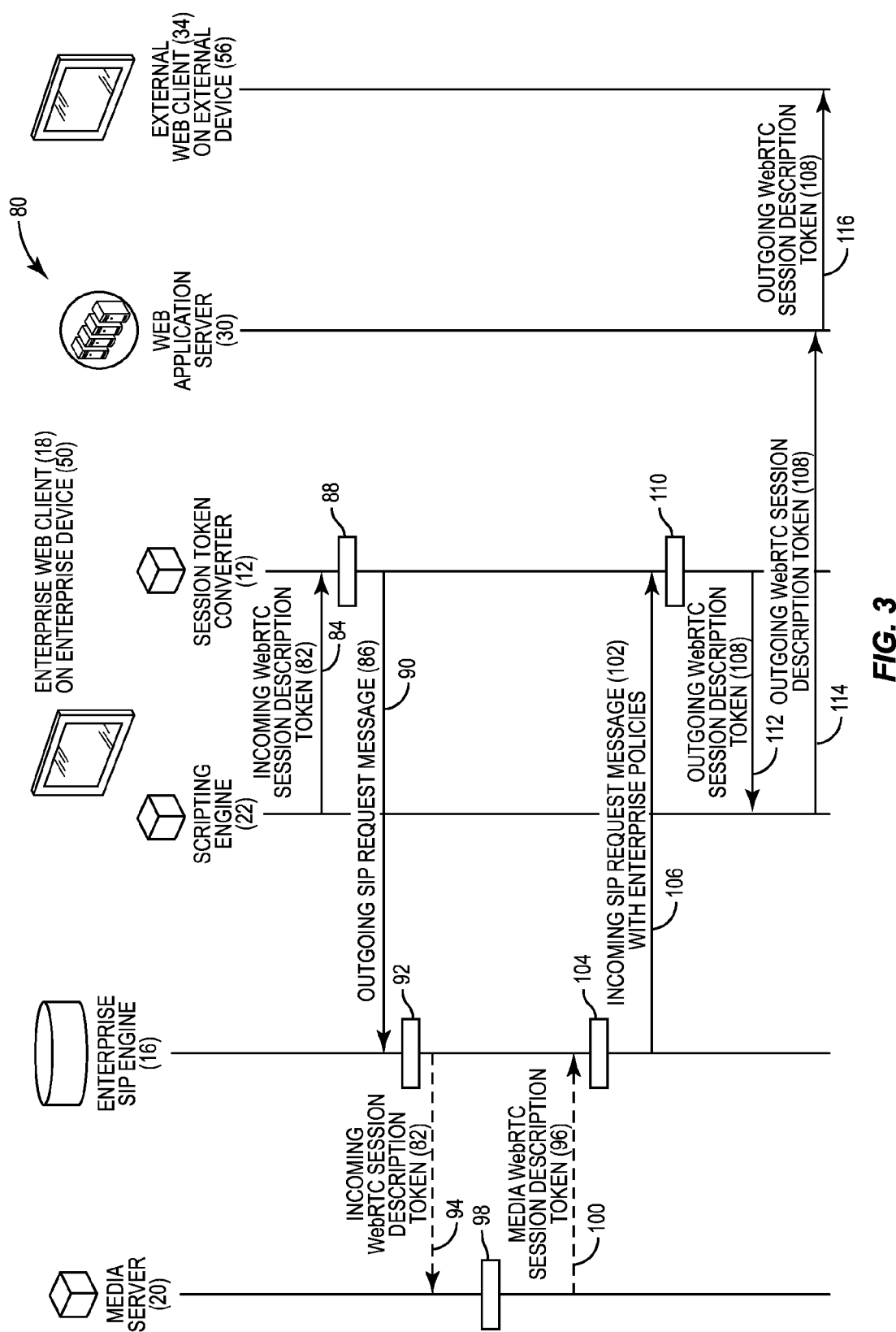
FIG. 3 is a diagram illustrating exemplary communication flows for applying enterprise policies to a WebRTC offer using an enterprise Session Initiation Protocol (SIP) engine and the session token converter in FIGS. 1 and 2.

To illustrate exemplary communications flows during the establishment of a WebRTC interactive session including the session token converter 12 in FIG. 2, FIG. 3 is provided. FIG. 3 shows an exemplary communication flow 80 involving a WebRTC offer within the system 48 in FIG. 2, including the session token converter 12.

In FIG. 3, the media server 20, the enterprise SIP engine 16, the scripting engine 22 on the enterprise web client 18, the session token converter 12, the web application server 30, and the external web client 34 on the external device 56 are each represented by vertical lines. It is to be understood that the external web client 34 may comprise the scripting engine 36 and a WebRTC functionality provider 58, which for the sake of clarity are omitted from this example. It is to be further understood that, in this example, the enterprise device 50 is considered the "sender" device, while the external device 56 is considered the "recipient" device, wherein the "sender" device initiates the WebRTC interactive session. However, in other embodiments, the enterprise device 50 may be the "recipient" device, while the external device 56 is the "sender" device. It is also assumed for this example that the enterprise web client 18 and the external web client 34 have each downloaded a WebRTC-enabled web application, such as an HTML5/JavaScript WebRTC application, from the web application server 30. Finally, it is to be understood that the terms "incoming" and "outgoing" used to describe a message indicate a communications flow relative to the session token converter 12. For example, the term "incoming" denotes that a message is passing to the session token converter 12 (i.e., is being received by the session token converter 12). Conversely, the descriptor "outgoing" indicates that a message is passing away from the session token converter 12 (i.e., is being sent by the session token converter 12).

With continuing reference to FIG. 3, upon initiation of a WebRTC offer, the session token converter 12 receives an incoming WebRTC session description token 82 from the scripting engine 22 (arrow 84). In some embodiments, as previously described, the incoming WebRTC session description token 82 may comprise an SDP object. The incoming WebRTC session description token 82 in this example was originally directed to the external device 56 as a WebRTC offer. In other embodiments, the incoming WebRTC session description token 82 could have been originally directed to the enterprise device 50 as a WebRTC offer from the external device 56. The session token converter 12 generates an outgoing SIP request message 86 from the incoming WebRTC session description token 82 (box 88). As a non-limiting example, the outgoing SIP request message 86 may include elements such as the incoming WebRTC session description token 82, a return destination of the enterprise device 50, and/or an indicator that the outgoing SIP request message 86 originated from an enterprise user. The session token converter 12 then sends the outgoing SIP request message 86 to the enterprise SIP engine 16 (arrow 90). Upon receiving the outgoing SIP request message 86, the enterprise SIP engine 16 applies one or more enterprise policies based on the contents of the outgoing SIP request message 86 (box 92). As previously described, such enterprise policies may include origination and/or termination polices, and may be applied by invoking particular applications and/or application sequences within the enterprise SIP engine 16.

In some embodiments, applying the enterprise policies may include optionally enabling media features to be used in conjunction with the WebRTC interactive session, such as, for example, recording audio or video. If such media features are to be enabled for the WebRTC interactive session, the enterprise SIP engine 16 sends the incoming WebRTC session description token 82 to the media server 20 (dashed arrow 94). The media server 20 uses the information in the outgoing WebRTC session description token 82 to generate a media WebRTC session description token 96 (box 98). As a non-limiting example, the media WebRTC session description token 96 provides important information, such as details instructing the external device 56 to connect directly to the media server 20 rather than to the enterprise device 50. The media server 20 then sends the media WebRTC session description token 96 to the enterprise SIP engine 16 (dashed arrow 100). The enterprise SIP engine 16 may include the media WebRTC session description token 96 in an incoming SIP request message 102 to be sent to the session token converter 12 (box 104). Additionally, in some embodiments, the media server 20 may be employed for manipulating and distributing media among WebRTC clients in a multi-party WebRTC session. As a non-limiting example, if four WebRTC clients take part in the same multi-party WebRTC session, each WebRTC client may connect to the media server 20, and the media server 20 may function to connect each WebRTC client to the remaining parties in the WebRTC session.

With continuing reference to FIG. 3, after the enterprise policies have been applied, the enterprise SIP engine 16 sends the incoming SIP request message 102 to the session token converter 12 (arrow 106). Notably, the incoming SIP request message 102 is the result of the enterprise SIP engine 16 applying enterprise policies based on the outgoing SIP request message 86. The session token converter 12 then converts the incoming SIP request message 102 into an outgoing WebRTC session description token 108 (box 110). Importantly, the outgoing WebRTC session description token 108 generated by the session token converter 12 includes the enterprise policies applied by the enterprise SIP engine 16. The session token converter 12 then sends the outgoing WebRTC session description token 108 to the scripting engine 22 (arrow 112). The scripting engine 22 then sends the outgoing WebRTC session description token 108 to the web application server 30 (arrow 114). The web application server 30 passes the outgoing WebRTC session description token 108 to the external web client 34 on the external device 56 (arrow 116). Thus, the session token converter 12 provides a mechanism by which enterprise policies may be applied to a WebRTC offer using the existing enterprise SIP engine 16, while ensuring that the WebRTC offer remains compatible with the WebRTC offer/answer exchange process. In embodiments in which the external device 56 provided the WebRTC offer, the steps associated with arrows 114 and 116 would not be present.

Figure 4:
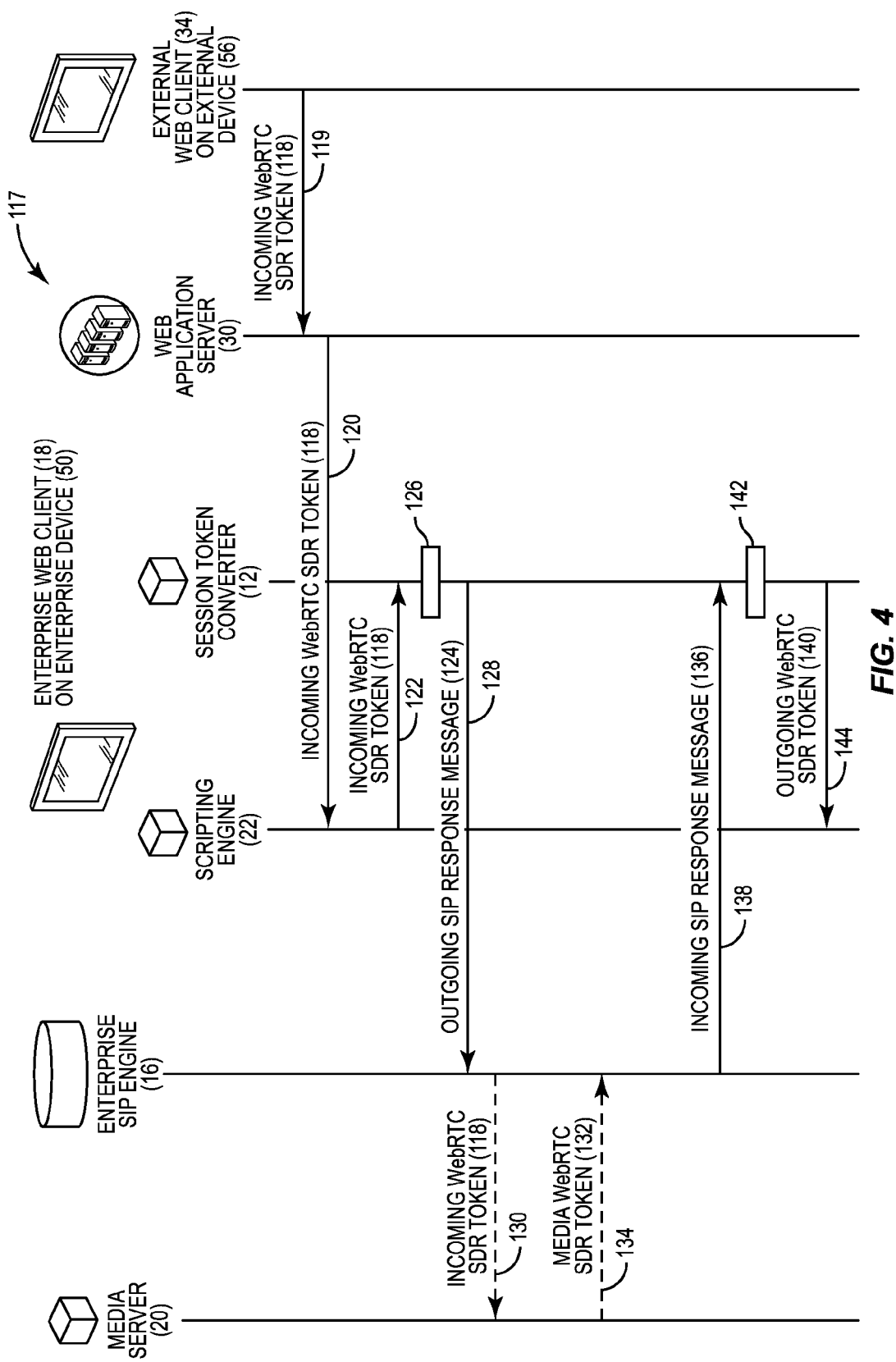
FIG. 4 is a diagram illustrating exemplary communication flows for applying enterprise policies to a WebRTC answer using the enterprise SIP engine and the session token converter in FIGS. 1 and 2.

To continue illustrating exemplary communications flows during the establishment of a WebRTC interactive session including the session token converter 12 in FIG. 2, FIG. 4 is provided. FIG. 4 illustrates an exemplary communication flow 117 involving a WebRTC answer within the system 48 in FIG. 2 including the session token converter 12. In FIG. 4, the external web client 34 of the external device 56 sends a WebRTC answer in the form of an incoming WebRTC session description response (SDR) token 118 to the web application server 30 in response to the WebRTC offer flow in FIG. 3 (arrow 119). The web application server 30 passes the incoming WebRTC SDR token 118 along to the enterprise device 50 (arrow 120). Further, upon the enterprise device 50 receiving the WebRTC answer, the session token converter 12 receives the incoming WebRTC SDR token 118 from the scripting engine 22 (arrow 122). The session token converter 12 generates an outgoing SIP response message 124 from the incoming WebRTC SDR token 118 (box 126). As a non-limiting example, the outgoing SIP response message 124 may include elements such as the incoming WebRTC SDR token 118 and an acknowledgement that a WebRTC interactive session sought by the incoming WebRTC SDR token 118 is accepted. The session token converter 12 then sends the outgoing SIP response message 124 to the enterprise SIP engine 16 (arrow 128).

With continuing reference to FIG. 4, upon the enterprise SIP engine 16 receiving the outgoing SIP response message 124, the enterprise SIP engine 16 completes establishment of the WebRTC interactive session between the enterprise device 50 and the external device 56. If certain media features are to be used in conjunction with the WebRTC interactive session, as previously described, the enterprise SIP engine 16 sends the incoming WebRTC SDR token 118 to the media server 20 when completing the WebRTC interactive session (dashed arrow 130). The media server 20 uses the information in the incoming WebRTC SDR token 118 to complete the establishment of one or more media capabilities of the WebRTC interactive session, and sends a media WebRTC session description response (SDR) token 132 to the enterprise SIP engine 16 (dashed arrow 134). So as to ensure the one or more media capabilities are enabled during the WebRTC interactive session, the enterprise SIP engine 16 includes the media WebRTC SDR token 132 in an incoming SIP response message 136. Once the WebRTC interactive session is completed, the enterprise SIP engine 16 sends the incoming SIP response message 136 to the session token converter 12 (arrow 138). The session token converter 12 converts the incoming SIP response message 136 into an outgoing WebRTC session description response (SDR) token 140 (box 142). The session token converter 12 then sends the outgoing WebRTC SDR token 140 to the scripting engine 22, thereby concluding the WebRTC offer/answer exchange (arrow 144).

To describe exemplary operations of the session token converter 12 and the application of enterprise policies to WebRTC interactive sessions using the enterprise SIP engine 16 of FIG. 2, FIGS. 5A-5F are provided. FIGS. 5A-5F illustrate a flowchart 146 of exemplary operations for application of enterprise policies to WebRTC interactive sessions. For illustrative purposes, FIGS. 5A-5F refer to elements of the exemplary system 48 and the session token converter 12 in FIG. 2 and to communications flows shown in FIGS. 3 and 4.

Figure 5A:
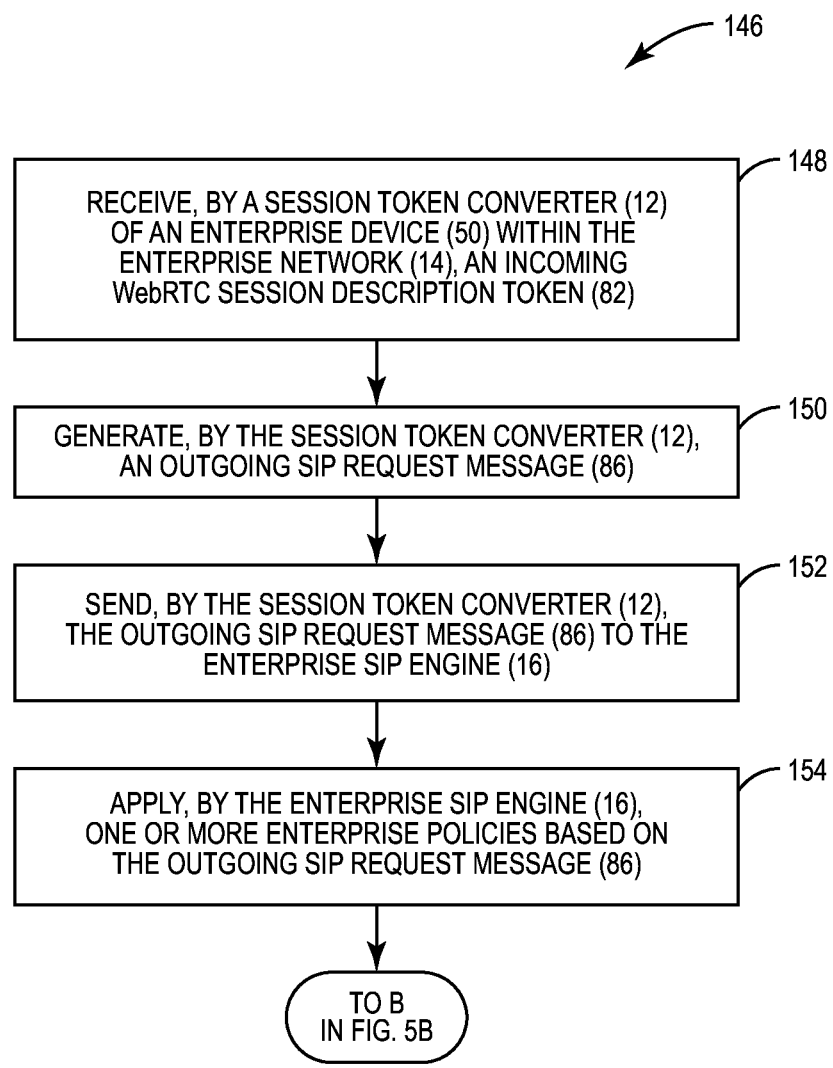
FIGS. 5A-5F are flowcharts illustrating exemplary operations for application of enterprise policies to WebRTC interactive sessions using an enterprise Session Initiation Protocol (SIP) engine.
Figure 5B:
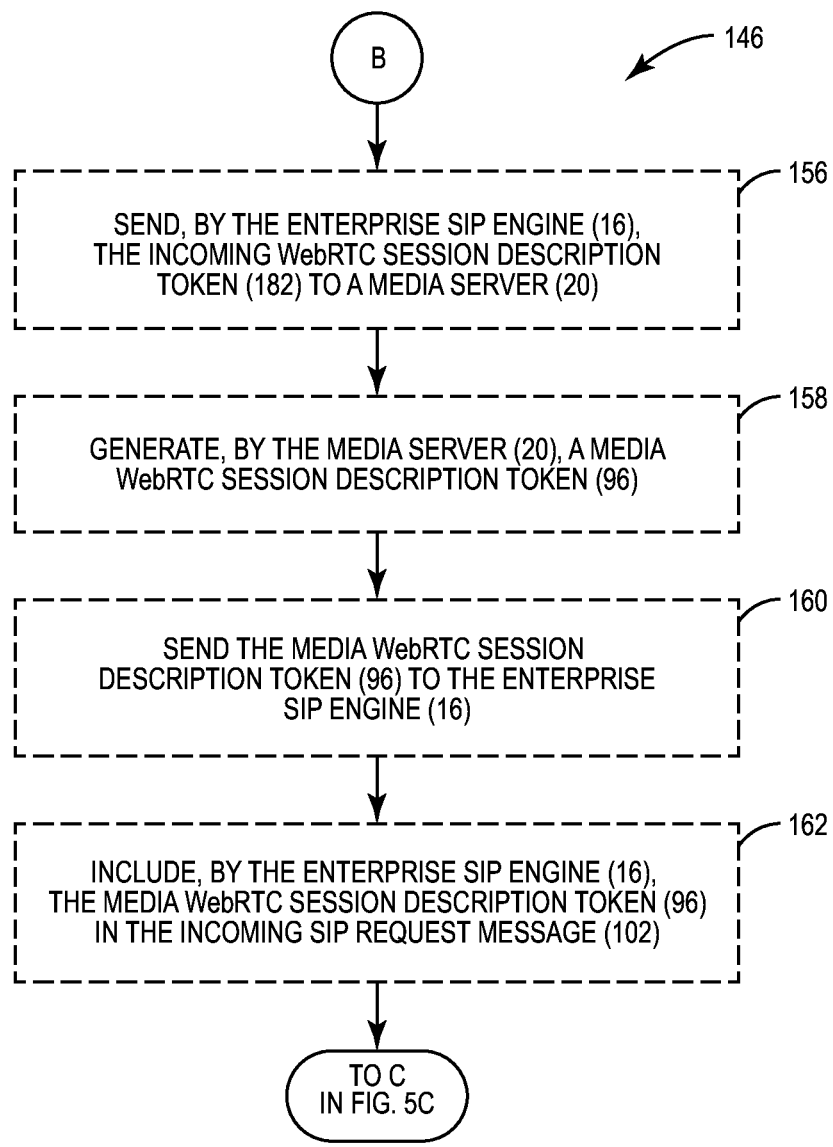
Figure 5C:
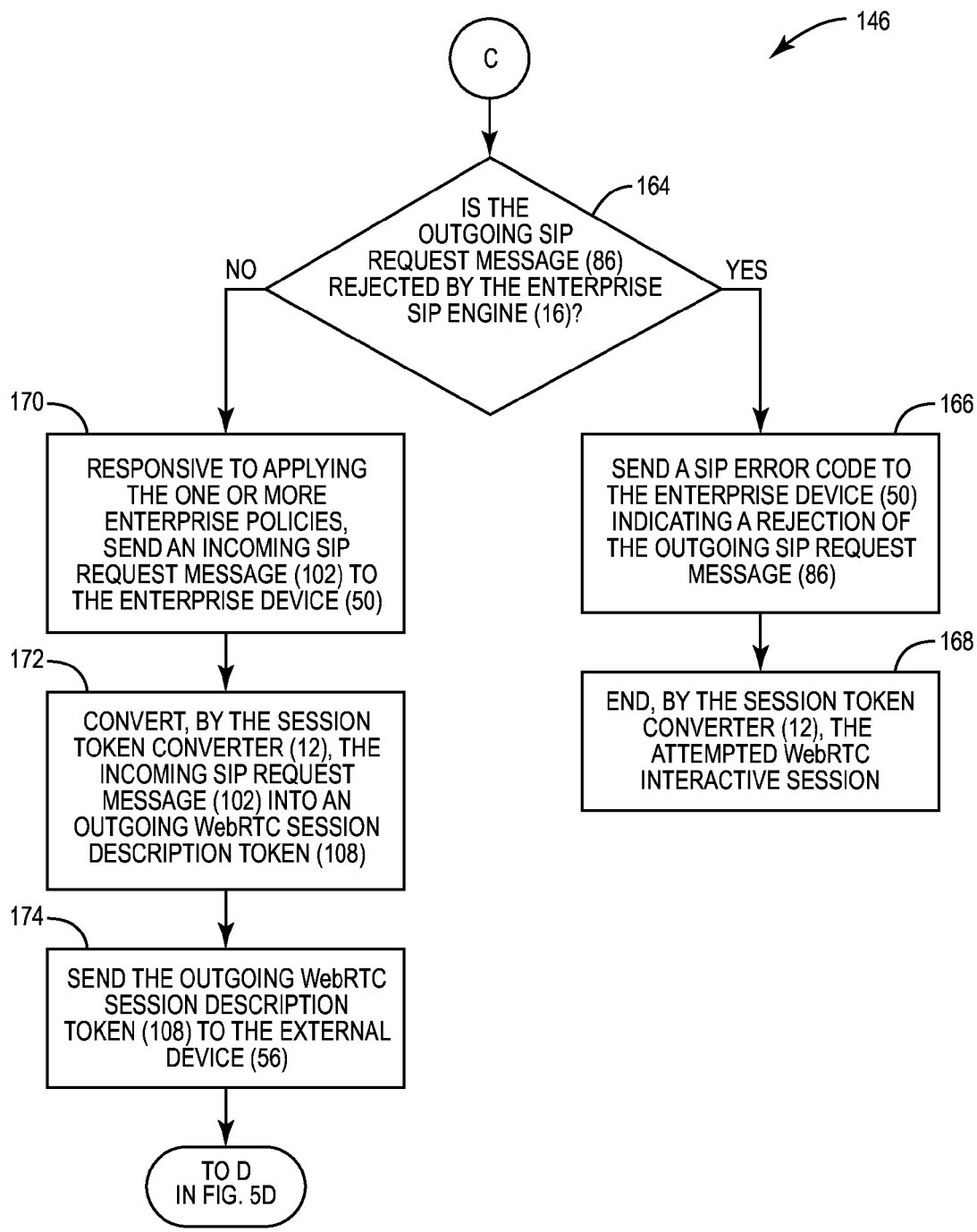
Figure 5D:
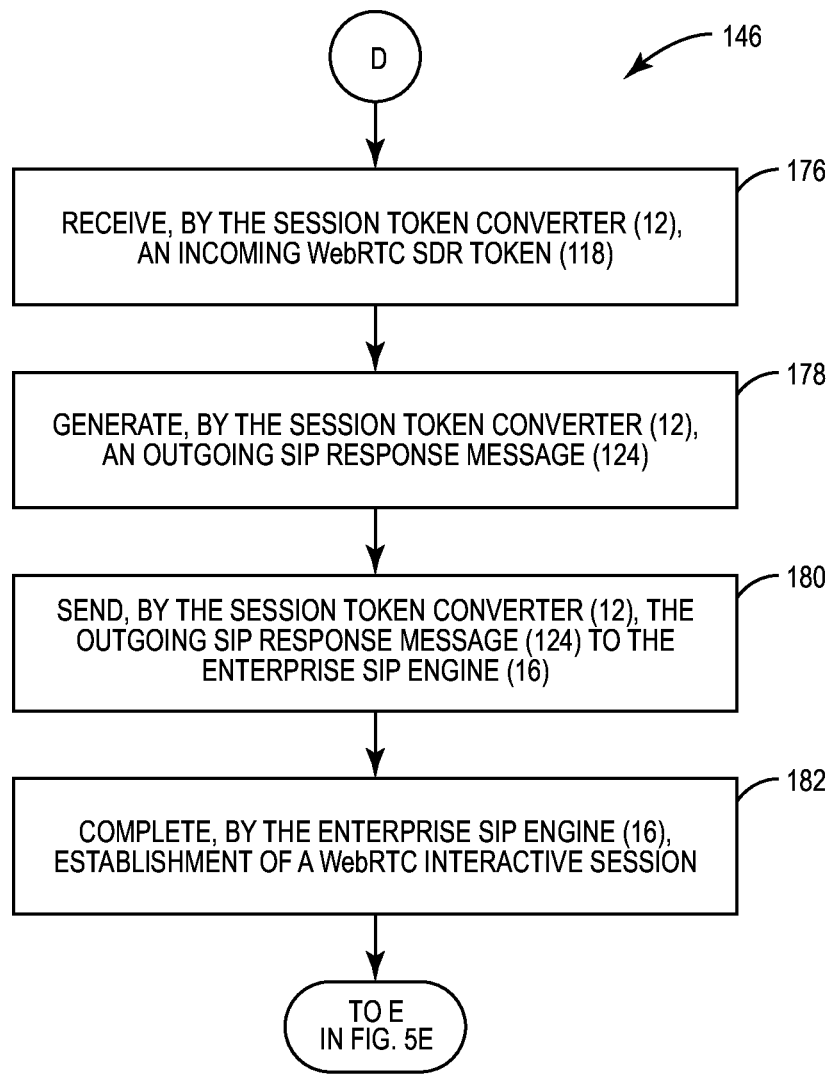

In this manner, FIG. 5A illustrates the session token converter 12 receiving the incoming WebRTC session description token 82, generating the outgoing SIP request message 86 and sending it to the enterprise SIP engine 16, and having the enterprise SIP engine 16 apply the enterprise policies. FIG. 5B details the enterprise SIP engine 16 sending the incoming WebRTC session description token 82 to the media server 20, the media server 20 generating and sending the media WebRTC session description token 96, and the enterprise SIP engine 16 including it in the incoming SIP request message 102. Further, FIG. 5C illustrates that the enterprise SIP engine 16 may reject or accept the outgoing SIP request message 86, and the resulting actions for each option. FIG. 5D illustrates the session token converter 12 receiving the incoming WebRTC SDR token 118 and sending the resulting generated outgoing SIP response message 124 to the enterprise SIP engine 16. Additionally, FIG. 5E details the media server 20 function as related to the incoming WebRTC SDR token 118. Finally, FIG. 5F illustrates the enterprise SIP engine 16 sending the incoming SIP response message 136 to the enterprise device 50, and the session token converter 12 converting it into the outgoing WebRTC SDR token 140, which is sent to the enterprise device 50 to conclude the WebRTC offer/answer exchange.

Referring to FIG. 5A, in this embodiment, operations begin with the session token converter 12 of the enterprise device 50 within the enterprise network 14 receiving an incoming WebRTC session description token 82 (block 148). The incoming WebRTC session description token 82 in this example is directed to an external device 56 external to the enterprise network 14. In some embodiments, the incoming WebRTC session description token 82 may comprise a WebRTC SDP object corresponding to a WebRTC offer.

The session token converter 12 next generates an outgoing SIP request message 86 (block 150). The outgoing SIP request message 86 may include, as non-limiting examples, the incoming WebRTC session description token 82, a return destination of the enterprise device 50, and/or an indicator that the outgoing SIP request message 86 originated from an enterprise user. The session token converter 12 then sends the outgoing SIP request message 86 to the enterprise SIP engine 16 (block 152). After receiving the outgoing SIP request message 86, the enterprise SIP engine 16 applies one or more enterprise policies based on the outgoing SIP request message 86 (block 154). As previously described, such policies may include origination and/or termination polices, and may be applied by invoking particular applications and/or application sequences within the enterprise SIP engine 16, as non-limiting examples.

Referring to FIG. 5B, applying the enterprise policies may include enabling certain media features to be used in conjunction with the WebRTC interactive session, such as, for example, recording audio or video. If such media features are to be enabled for the WebRTC interactive session, the enterprise SIP engine 16 sends the incoming WebRTC session description token 82 to the media server 20 (block 156). After receiving the incoming WebRTC session description token 82, the media server 20 generates the media WebRTC session description token 96 (block 158). The media server 20 then sends the media WebRTC session description token 96 to the enterprise SIP engine 16 (block 160). Upon receiving the media WebRTC session description token 96, the enterprise SIP engine 16 includes the media WebRTC session description token 96 in the incoming SIP request message 102, which contains any previously applied enterprise policies (block 162). By including the media WebRTC session description token 96 in the incoming SIP request message 102, the enterprise SIP engine 16 is able to apply enterprise policies while also enabling the previously described media features to operate in conjunction with the interactive session.

Referring now to FIG. 5C, responsive to the enterprise SIP engine 16 applying the enterprise policies and, if applicable, communicating with the media server 20 as previously described, the enterprise SIP engine 16 determines whether the outgoing SIP request message 86 is accepted or rejected (block 164). If the enterprise SIP engine 16 determines at block 164 that the outgoing SIP request message 86 is rejected, the enterprise SIP engine 16 sends a SIP error code (not shown in FIG. 3) to the enterprise device 50 indicating such a rejection (block 166). The session token converter 12 then ends the attempted WebRTC interactive session (block 168). Alternatively, if the enterprise SIP engine 16 accepts the outgoing SIP request message 86 at block 164, the enterprise SIP engine 16 sends the incoming SIP request message 102 to the enterprise device 50 (block 170). The incoming SIP request message 102 is the result of the enterprise SIP engine 16 applying enterprise policies based on the outgoing SIP request message 86. When the session token converter 12 receives the incoming SIP request message 102, the session token converter 12 converts the incoming SIP request message 102 into the outgoing WebRTC session description token 108 (block 172). Following this conversion, the enterprise device 50 sends the outgoing WebRTC session description token 108 to a target device, which is the external device 56 (block 174) in this example. In this embodiment, the enterprise device 50 initiates the WebRTC interactive session, and thus the flow of operations through block 174 represents the process for sending a WebRTC offer to the external device 56. However, in other embodiments in which the enterprise device 50 does not initiate the WebRTC interactive session, the flow of operations through block 174 may represent the process for the enterprise device 50 processing a WebRTC offer originating from the external device 56. In such other embodiments in which a WebRTC offer originates from the external device 56, the target device would be the enterprise device 50.

Referring to FIG. 5D, after the external device 56 has processed the outgoing WebRTC session description token 108, the session token converter 12 receives the incoming WebRTC SDR token 118 (block 176). The session token converter 12 uses the incoming WebRTC SDR token 118 to generate the outgoing SIP response message 124 (block 178). The session token converter 12 then sends the outgoing SIP response message 124 to the enterprise SIP engine 16 (block 180). Upon the enterprise SIP engine 16 receiving the outgoing SIP response message 124, the enterprise SIP engine 16 completes establishment of the WebRTC interactive session between the enterprise device 50 and the external device 56 (block 182).

Figure 5E:
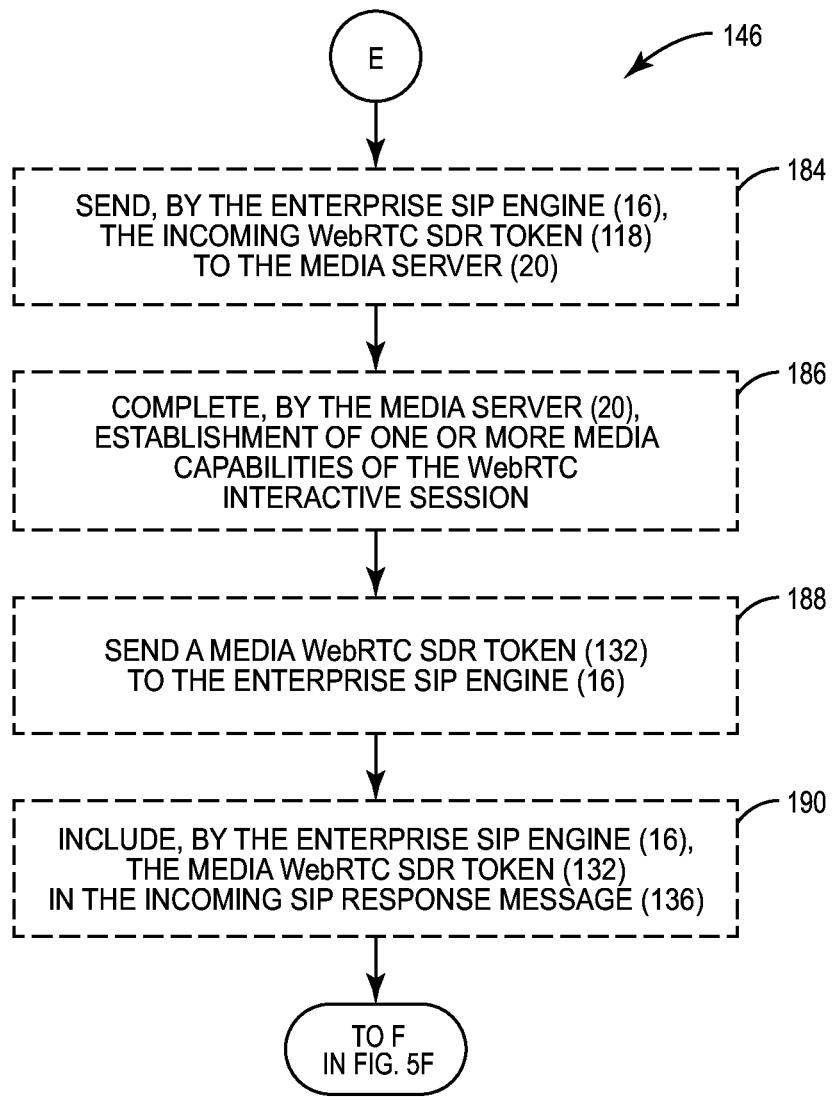
Figure 5F:
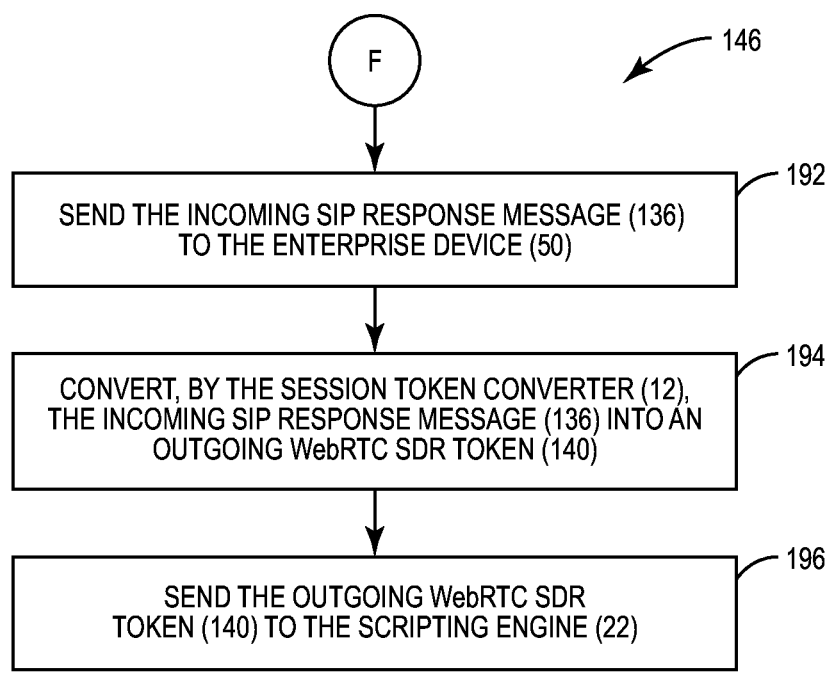

Referring to FIG. 5E, if certain media features are to be used in conjunction with the WebRTC interactive session, as previously described, the enterprise SIP engine 16 sends the incoming WebRTC SDR token 118 to the media server 20 when completing the WebRTC interactive session (block 184). The media server 20 uses the information in the incoming WebRTC SDR token 118 to complete the establishment of one or more media capabilities to be used in the WebRTC interactive session (block 186). In doing so, the media server 20 sends a media WebRTC SDR token 132 to the enterprise SIP engine 16 (block 188). So as to ensure the one or more media capabilities are enabled during the WebRTC interactive session, the enterprise SIP engine 16 includes the media WebRTC SDR token 132 in the incoming SIP response message 136 (block 190).

Referring to FIG. 5F, once the WebRTC interactive session is completed, the enterprise SIP engine 16 sends the incoming SIP response message 136 to the enterprise device 50 (block 192). The session token converter 12 converts the incoming SIP response message 136 into the outgoing WebRTC SDR token 140 (block 194). The session token converter 12 then sends the outgoing WebRTC SDR token 140 to the scripting engine 22, thereby concluding the WebRTC offer/answer exchange (block 196). In this embodiment, the enterprise device 50 initiates the WebRTC interactive session, and thus the flow of operations from block 176 through block 196 represents the process for concluding the WebRTC offer/answer exchange. In other embodiments in which the external device 56 initiates the WebRTC interactive session, the flow from block 148 through block 174 would represent the process for processing a WebRTC offer received from the external device 56.

Figure 6:
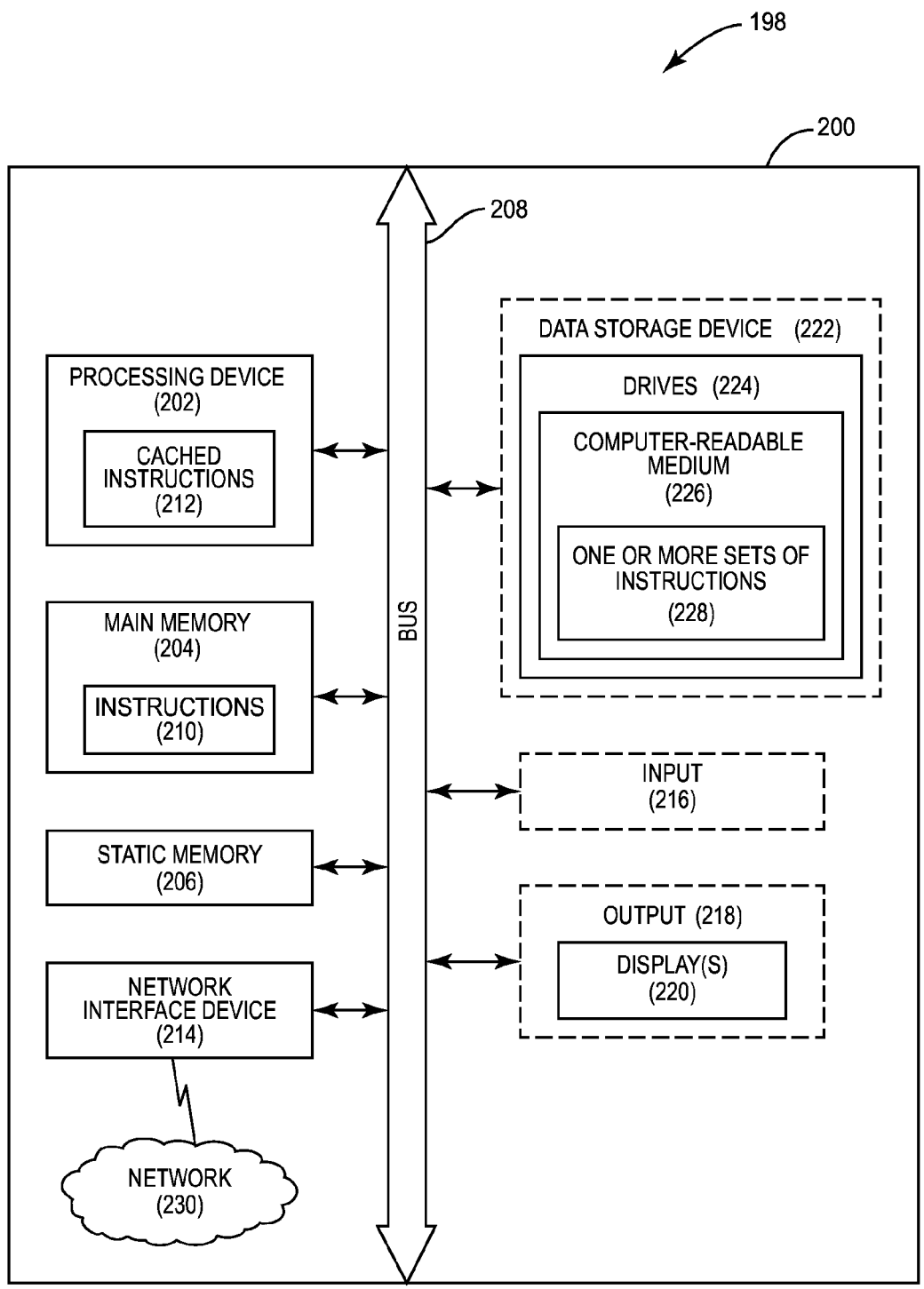
FIG. 6 is a block diagram of an exemplary processor-based system that can include the session token converter and the enterprise SIP engine in FIG. 1.

FIG. 6 provides a schematic diagram representation of a processing system 198 in the exemplary form of an exemplary computer system 200 adapted to execute instructions from an exemplary computer-readable medium to perform the functions described herein. In this regard, the processing system 198 may comprise the computer system 200 within which a set of instructions for causing the processing system 198 to perform any one or more of the methodologies discussed herein may be executed. The processing system 198 may be connected (as a non-limiting example, networked) to other machines in a local area network (LAN), an intranet, an extranet, or the Internet. The processing system 198 may operate in a client-server network environment, or as a peer machine in a peer-to-peer (or distributed)

network environment. While only a single processing system 198 is illustrated, the terms "controller" and "server" shall also be taken to include any collection of machines that individually or jointly execute a set (or multiple sets) of instructions to perform any one or more of the methodologies discussed herein. The processing system 198 may be a server, a personal computer, a desktop computer, a laptop computer, a personal digital assistant (PDA), a computing pad, a mobile device, or any other device and may represent, as non-limiting examples, a server or a user's computer.

The exemplary computer system 200 includes a processing device or processor 202, a main memory 204 (as non-limiting examples, read-only memory (ROM), flash memory, dynamic random access memory (DRAM) such as synchronous DRAM (SDRAM), etc.), and a static memory 206 (as non-limiting examples, flash memory, static random access memory (SRAM), etc.), which may communicate with each other via a bus 208. Alternatively, the processing device 202 may be connected to the main memory 204 and/or the static memory 206 directly or via some other connectivity means.

The processing device 202 represents one or more processing devices such as a microprocessor, central processing unit (CPU), or the like. More particularly, the processing device 202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 202 is configured to execute processing logic in instructions 210 and/or cached instructions 212 for performing the operations and steps discussed herein.

The computer system 200 may further include a communications interface in the form of a network interface device 214. It also may or may not include an input 216 to receive input and selections to be communicated to the computer system 200 when executing instructions. It also may or may not include an output 218, including but not limited to display(s) 220, a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 200 may or may not include a data storage device 222 that includes using drive(s) 224 to store functions herein described in a computer-readable medium 226 on which is stored one or more sets of instructions 228 (e.g., software) embodying any one or more of the methodologies or functions described herein. The one or more instructions 228 may also reside, completely or at least partially, within the main memory 204 and/or within the processing device 202 during execution thereof by the computer system 200, the main memory 204, and the processing device 202 also constituting machine-accessible storage media. The instructions 210, 212, and/or 228 may further be transmitted or received over a network 230 via the network interface device 214. The network 230 can be an intra-network or an inter-network.

While the computer-readable medium 226 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 228. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, and optical and magnetic media.

Application of enterprise policies to WebRTC interactive sessions using an enterprise SIP engine, and related methods, systems, and computer-readable media according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for applying enterprise policies to Web Real-Time Communications (WebRTC) interactive sessions using an enterprise Session Initiation Protocol (SIP) engine, comprising:

receiving, by a session token converter of an enterprise device representing a first endpoint of a WebRTC interactive session within an enterprise network, an incoming WebRTC session description token;

generating, by the session token converter, a first SIP request message, wherein the first SIP request message comprises:

the incoming WebRTC session description token;

a return destination of the enterprise device, wherein the return destination comprises one or more of a destination IP address and/or a destination port number associated with the enterprise device; and an indicator that the first SIP request message originated from an enterprise user;

sending, by the session token converter, the first SIP request message to an enterprise SIP engine;

the enterprise SIP engine evaluating the first SIP request message, wherein evaluating the first SIP request message comprises applying an enterprise policy to one or more of (1) the incoming WebRTC session description token, (2) the return destination of the enterprise device, and/or (3) the indicator that the first SIP request message originated from an enterprise user;

based on the evaluation, the enterprise SIP engine generating a second SIP request message;

the enterprise SIP engine sending the second SIP request message to the session token converter;

receiving, by the session token converter, the second SIP request message generated by the enterprise SIP engine based on the application of one or more enterprise policies;

converting, by the session token converter, the second SIP request message into an outgoing WebRTC session description token; and sending the outgoing WebRTC session description token to a target device representing a second endpoint of the WebRTC interactive session.

2. The method of claim 1, wherein the application of the one or more enterprise policies by the enterprise SIP engine comprises:

sending, by the enterprise SIP engine, the incoming WebRTC session description token to a media server;

receiving, by the enterprise SIP engine from the media server, a media WebRTC session description token; and including, by the enterprise SIP engine, the media WebRTC session description token in the incoming SIP request message.

3. The method of claim 1, wherein:

the enterprise device comprises an enterprise WebRTC client initiating a WebRTC interactive flow;

the outgoing WebRTC session description token comprises a WebRTC offer of a WebRTC offer/answer exchange; and the target device comprises an external device.

4. The method of claim 1, wherein:

the enterprise device comprises an enterprise WebRTC client receiving a request to initiate a WebRTC interactive flow;

the outgoing WebRTC session description token comprises a WebRTC offer of a WebRTC offer/answer exchange; and the target device comprises the enterprise device.

5. The method of claim 1, wherein the one or more enterprise policies comprises origination policies, termination policies, or a combination thereof, of the enterprise SIP engine.

6. The method of claim 1, further comprising, receiving, by the enterprise device, a SIP error code from the enterprise SIP engine, wherein the SIP error code indicates a rejection of the outgoing SIP request message by the enterprise SIP engine.

7. The method of claim 6, further comprising, responsive to the enterprise device receiving the SIP error code, ending, by the session token converter, an attempted WebRTC interactive session.

8. The method of claim 1, further comprising:

receiving, by the session token converter, an incoming WebRTC session description response token;

generating, by the session token converter, an outgoing SIP response message, wherein the outgoing SIP response message comprises:

the incoming WebRTC session description response token; and an acknowledgment that the WebRTC interactive session sought by the incoming WebRTC session description response token is accepted;

sending, by the session token converter, the outgoing SIP response message to the enterprise SIP engine;

receiving, by the session token converter, an incoming SIP response message from the enterprise SIP engine upon completion of establishment of the WebRTC interactive session; and converting, by the session token converter, the incoming SIP response message into an outgoing WebRTC session description response token.

9. The method of claim 8, wherein completion of establishment of the WebRTC interactive session by the enterprise SIP engine comprises:

sending, by the enterprise SIP engine, the incoming WebRTC session description response token to a media server;

receiving, by the enterprise SIP engine, a media WebRTC session description response upon completion of establishment of one or more media capabilities of the WebRTC interactive session by the media server; and including, by the enterprise SIP engine, the media WebRTC session description response token in the incoming SIP response message.

10. A system for applying enterprise policies to Web Real-Time Communications (WebRTC) interactive sessions using an enterprise Session Initiation Protocol (SIP) engine, comprising:

at least one communications interface; and an enterprise device representing a first endpoint of a WebRTC interactive session within an enterprise network associated with the at least one communications interface and comprising a session token converter, the session token converter to:

receive an incoming WebRTC session description token;

generate a first SIP request message, wherein the first SIP request message comprises:

the incoming WebRTC session description token;

a return destination of the enterprise device, wherein the return destination comprises one or more of a destination IP address and/or a destination port number associated with the enterprise device; and an indicator that the first SIP request message originated from an enterprise user; and send the first SIP request message to an enterprise SIP engine;

the enterprise SIP engine to:

apply one or more enterprise rules to one or more of the incoming WebRTC session description token, the return destination of the enterprise device, and/or the indicator that the first SIP request message originated from an enterprise user;

based on the evaluation, generate a second SIP request message;

send the second SIP request message to the session token converter; and the session token converter of the enterprise device further to:

convert the incoming SIP request message into an outgoing WebRTC session description token; and send the outgoing WebRTC session description token to a target device representing a second endpoint of the WebRTC interactive session.

11. The system of claim 10, wherein the one or more enterprise policies comprises origination policies, termination policies, or a combination thereof, of the enterprise SIP engine.

12. The system of claim 10, further comprising:

a media server;

the enterprise SIP engine to apply the one or more enterprise policies based on the outgoing SIP request message by:

sending the incoming WebRTC session description token to the media server; and including a media WebRTC session description token in the incoming SIP request message; and the media server to:

generate the media WebRTC session description token; and send the media WebRTC session description token to the enterprise SIP engine.

13. The system of claim 10, further comprising:

the enterprise SIP engine, responsive to applying the one or more enterprise policies, further to send a SIP error code to the enterprise device, wherein the SIP error code indicates a rejection of the outgoing SIP request message by the enterprise SIP engine.

14. The system of claim 13, further comprising:

the session token converter, responsive to the enterprise device receiving the SIP error code, to end an attempted WebRTC interactive session.

15. The system of claim 10, further comprising:

the session token converter, further to:

receive an incoming WebRTC session description response token; and generate an outgoing SIP response message, wherein the outgoing SIP response message comprises:

the incoming WebRTC session description response token; and an acknowledgment that the WebRTC interactive session sought by the incoming WebRTC session description response token is accepted; and send the outgoing SIP response message to the enterprise SIP engine;

the enterprise SIP engine further to:

complete establishment of an interactive session; and send an incoming SIP response message to the enterprise device; and the session token converter further to convert the incoming SIP response message into an outgoing WebRTC session description response token.

16. The system of claim 15, further comprising:

a media server;

the enterprise SIP engine further to complete establishment of the interactive session by:

sending the incoming WebRTC session description response token to the media server; and including a media WebRTC session description response token in the incoming SIP response message; and the media server further configured to:

completing establishment of one or more media capabilities of the interactive session; and sending a media WebRTC session description response token to the enterprise SIP engine.

17. A non-transitory computer-readable medium having stored thereon computer-executable instructions to cause a processor to implement a method, comprising:

receiving, by a session token converter of an enterprise device representing a first endpoint of a Web Real-Time Communications (WebRTC) interactive session within an enterprise network, an incoming WebRTC session description token;

generating, by the session token converter, a first Session Initiation Protocol (SIP) request message, wherein the first SIP request message comprises:
   the incoming WebRTC session description token;
   a return destination of the enterprise device, wherein the return destination comprises one or more of a destination IP address and/or a destination port number associated with the enterprise device; and
   an indicator that the first SIP request message originated from an enterprise user;
sending, by the session token converter, the first SIP request message to an enterprise SIP engine;
the enterprise SIP engine evaluating the first SIP request message, wherein evaluating the first SIP request message comprises applying an enterprise policy to one or more of (1) the incoming WebRTC session description token, (2) the return destination of the enterprise device, and/or (3) the indicator that the first SIP request message originated from an enterprise user;
based on the evaluation, the enterprise SIP engine generating a second SIP request message;
the enterprise SIP engine sending the second SIP request message to the session token converter;
receiving, by the session token converter, the second SIP request message generated by the enterprise SIP engine based on the application of one or more enterprise policies;
converting, by the session token converter, the second SIP request message into an outgoing WebRTC session description token; and
sending the outgoing WebRTC session description token to a target device representing a second endpoint of the WebRTC interactive session.

18. The non-transitory computer-readable medium of claim 17 having stored thereon the computer-executable instructions to cause the processor to implement the method, wherein the application of the one or more enterprise policies by the enterprise SIP engine comprises:
   WebRTC session description token to a media server;
   receiving, by the enterprise SIP engine from the media server, a media WebRTC session description token; and
   including, by the enterprise SIP engine, the media WebRTC session description token in the incoming SIP request message.

19. The non-transitory computer-readable medium of claim 17 having stored thereon the computer-executable instructions to cause the processor to implement the method, further comprising:
   receiving, by the session token converter, an incoming WebRTC session description response token;
   generating, by the session token converter, an outgoing SIP response message, wherein the outgoing SIP response message comprises:
      the incoming WebRTC session description response token; and
      an acknowledgment that the WebRTC interactive session sought by the incoming WebRTC session description response token is accepted;
   sending, by the session token converter, the outgoing SIP response message to the enterprise SIP engine;
   receiving, by the session token converter, an incoming SIP response message from the enterprise SIP engine upon completion of establishment of the WebRTC interactive session; and
   converting, by the session token converter, the incoming SIP response message into an outgoing WebRTC session description response token.

20. The non-transitory computer-readable medium of claim 19 having stored thereon the computer-executable instructions to cause the processor to implement the method, wherein completion of establishment of the WebRTC interactive session by the enterprise SIP engine comprises:
   sending, by the enterprise SIP engine, the incoming WebRTC session description response token to a media server;
   receiving, by the enterprise SIP engine, a media WebRTC session description response upon completion of establishment of one or more media capabilities of the WebRTC interactive session by the media server; and
   including, by the enterprise SIP engine, the media WebRTC session description response token in the incoming SIP response message.

* * * * *